Patented Jan. 19, 1943

2,308,879

UNITED STATES PATENT OFFICE 2,308,879

COATING COMPOSITION AND PROCESS OF MAKING THE SAME

Eugen Hirsch, Vienna, Austria, assignor to E. I. du Pont de Nemours & Company, Wilmington, Del., a corporation of Delaware No Drawing. Application February 23, 1938, Serial No. 191,961

1 Claim. (Cl. 260—740)

This invention relates to coating compositions and more particularly to water paints having exceptionally good resistance to washing.

Heretofore, water paints such as those containing casein have been known but have had a relatively low resistance to washing. Moreover, such paints are characterized by exceptional flatness.

It is an object of the present invention to provide a water paint which may readily be applied by means of brushing, spraying, dipping, or any of the common methods.

It is also an object of this invention to provide a paint having a semi-gloss appearance and one which is flexible, resistant to scratching, abrasion, and peeling.

It is a further object of this invention to provide a water paint which has good hiding power and exceptional adhesion to ordinary materials which are usually coated with paint as well as non-porous surfaces such as metal and even glass.

These objects are accomplished by combining glue, casein, Congo gum, and latex in suitable proportions and under such conditions that chemical reaction takes place between at least two of the ingredients, with the result that the properties of each are mutually enhanced giving results far superior to what might be expected from the individual ingredients if no reaction had taken place.

The following example is given to illustrate one embodiment of the present invention, although it will be understood that this example is given merely by way of illustration and not by way of limitation:

EXAMPLE 1

Portion 1

| | Parts by weight |
|---|---|
| Congo gum | 120 |
| Potassium carbonate | 30 |
| Water | 450 |

Portion 2

| | |
|---|---|
| Hide glue | 397 |
| Distilled water | 1,906 |
| Urea | 170 |
| Salicilic acid | 15 |
| Casein | 453 |
| Borax | 30 |

Portion 3

| | |
|---|---|
| Latex (60% solids) | 795 |

The first portion of the vehicle is prepared as follows:

The Congo gum, preferably in powdered form, is added to the water and potassium carbonate, heated to 200° F., and then stirred for about 15 minutes. The Congo gum will be found to disperse uniformly. Any undissolved residue in the above solution should be strained out and the solution is then ready for use. While raw Congo gum may be used, it is preferred to use a gum which has been treated, properly known as masticated gum.

Portion 2

The above-mentioned quantity of glue is soaked in water for approximately two hours and is then placed in a steam jacketed kettle and heated to about 100° F., while hot the urea, salicilic acid, casein, and borax are added and cooked to about 200° F. with constant stirring for approximately 20 minutes. Any undissolved material is strained from the liquid and the vehicle is then ready for further treatment.

The whole of portion 1 of the vehicle is then mixed with 670 parts of the second portion and added to 1906 parts of distilled or softened water and 100 parts of mineral oil. This solution is then stirred until all of the vehicle is thoroughly dissolved. When well mixed, 2700 parts of lithopone, 453 titanium dioxide, and 1350 parts of asbestine are added to a mixer in alternate portions with the vehicle and mixed for about 30 minutes. The material is then put through a roller mill or ground in any suitable grinding equipment after which it is mixed with 795 parts of latex. The material is then ready for use.

It will be obvious to those skilled in the art that changes in the proportions and in some of the ingredients may be made. It is to be understood, however, that Congo gum is an essential ingredient in this composition and cannot be substituted by any other natural or synthetic resin except in a very minor operation. As far as the applicant is aware, no other natural gum or resin is the equivalent of Congo.

The other ingredients are not particularly critical although it has been found that they are preferred for various reasons. In the formula given the hide glue has binding qualities, gives adhesion to the film, and has also been found to be an accelerator to a certain extent in that it hastens the drying of the film. It also increases the body of the paint.

The urea is added as a dispersing agent and to reduce the viscosity so that a higher percentage of solids may be used and still have an easy flowing consistency.

The casein promotes adhesion as well as the washability and increases in the body of the paint. The Congo gum gives the finished dried product an increased gloss which makes it a semi-gloss paint which has heretofore been unknown in water paints. The Congo gum also increases washability and adhesion. It has also been found that latex is a surprisingly efficient plasticizer for Congo and also increases washability as well as flexibility.

From the above, it will be apparent that if the glue or casein is increased, the body of the paint will be very heavy and will be difficult to brush out. If the quantity of urea is increased, the body will gradually be decreased, but if too much is added, settling will take place. It will be apparent that the above ingredients may be varied to suit the requirements of the use to which the paint is to be put and while no limitation is placed on the percentage of the ingredients shown in the preferred examples, these percentages cannot be varied through great limits without changing one or more properties of the finished composition.

It is apparent that many widely different embodiments of this invention may be made without departing from the spirit and scope thereof; and, therefore, it is not intended to be limited except as indicated in the appended claim.

I claim:

A water paint of brushing consistency containing about 120 parts of Congo gum dispersed in an alkaline solution, about 400 parts of glue, about 170 parts of urea, about 450 parts of casein, and about 800 parts of latex (60% solids).

EUGEN HIRSCH.

CERTIFICATE OF CORRECTION.

Patent No. 2,308,879.                                    January 19, 1943.

EUGEN HIRSCH.

It is hereby certified that error appears in the printed specification of the above numbered patent requiring correction as follows: Page 1, second column, line 39, for "operation" read --proportion--; and that the said Letters Patent should be read with this correction therein that the same may conform to the record of the case in the Patent Office.

Signed and sealed this 9th day of March, A. D. 1943.

Henry Van Arsdale, (Seal)                     Acting Commissioner of Patents.